US011169124B2

(12) United States Patent
Cardin

(10) Patent No.: US 11,169,124 B2
(45) Date of Patent: Nov. 9, 2021

(54) SYSTEM AND METHOD FOR REAL TIME MONITORING OF A CHEMICAL SAMPLE

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

(*) Notice: Subject to any disclaimer, the term of this patent is extended or adjusted under 35 U.S.C. 154(b) by 171 days.

(21) Appl. No.: 16/197,791

(22) Filed: Nov. 21, 2018

(65) Prior Publication Data
US 2019/0154638 A1    May 23, 2019

Related U.S. Application Data

(60) Provisional application No. 62/727,200, filed on Sep. 5, 2018, provisional application No. 62/589,798, filed on Nov. 22, 2017.

(51) Int. Cl.
*G01N 30/08* (2006.01)
*G01N 30/10* (2006.01)
(Continued)

(52) U.S. Cl.
CPC .............. *G01N 30/08* (2013.01); *G01N 30/06* (2013.01); *G01N 30/10* (2013.01); *G01N 30/40* (2013.01);
(Continued)

(58) Field of Classification Search
CPC .................................................... G01N 30/08
(Continued)

(56) References Cited

U.S. PATENT DOCUMENTS 4,180,389 A    12/1979 Paul
5,288,310 A    2/1994 Peters et al.
(Continued)

FOREIGN PATENT DOCUMENTS

CN    1346055 A    4/2002
CN    101609072 A    12/2009
(Continued)

OTHER PUBLICATIONS

Anonymous. (2006). "HiSiv 3000, Adsorbent", UOP, LLC, www.uop.com, one page.
(Continued)

*Primary Examiner* — Walter L Lindsay, Jr.
*Assistant Examiner* — Philipmarcus T Fadul
(74) *Attorney, Agent, or Firm* — Kubota & Basol LLP

(57) ABSTRACT

The disclosed system and method improve measurement of trace volatile chemicals, such as by Gas Chromatography (GC) and Gas Chromatography/Mass Spectrometry (GCMS). A first trapping system can include a plurality of capillary columns in series and a focusing column fluidly coupled to a first detector. The first trapping system can retain and separate compounds in a sample, including C3 hydrocarbons and compounds heavier than C3 hydrocarbons (e.g., up to C12 hydrocarbons, or compounds having a boiling point around 250° C.), and can transfer the compounds from the focusing column to the first detector. A second trapping system can receive compounds that the first trapping system does not retain, and can include a packed trap, a polar column and a PLOT column fluidly coupled to one or more second detectors. The second trapping system can remove water from the sample and can separate and detect compounds including C2 hydrocarbons and Formaldehyde.

20 Claims, 5 Drawing Sheets

(51) Int. Cl.
*G01N 30/46* (2006.01)
*G01N 30/40* (2006.01)
*G01N 30/06* (2006.01)
*G01N 30/88* (2006.01)
*G01N 30/02* (2006.01)
*G01N 30/72* (2006.01)
*G01N 30/60* (2006.01)

(52) U.S. Cl.
CPC ......... *G01N 30/461* (2013.01); *G01N 30/462* (2013.01); *G01N 30/88* (2013.01); *G01N 30/466* (2013.01); *G01N 30/6078* (2013.01); *G01N 30/7206* (2013.01); *G01N 2030/025* (2013.01); *G01N 2030/085* (2013.01); *G01N 2030/402* (2013.01); *G01N 2030/407* (2013.01); *G01N 2030/8854* (2013.01)

(58) Field of Classification Search
USPC ....................................................... 73/23.41
See application file for complete search history.

(56) References Cited

U.S. PATENT DOCUMENTS

| | | | | |
|---|---|---|---|---|
| 5,547,497 | A | * | 8/1996 | Klemp ................ G01N 30/12 73/23.41 |
| 5,720,798 | A | | 2/1998 | Nickerson et al. |
| 5,795,368 | A | | 8/1998 | Wright et al. |
| 2001/0027722 | A1 | * | 10/2001 | Bremer ................ G01N 30/12 95/82 |
| 2003/0109794 | A1 | | 6/2003 | Phillips |
| 2005/0014156 | A1 | | 1/2005 | Pawliszyn |
| 2006/0153740 | A1 | | 7/2006 | Sultan et al. |
| 2006/0154377 | A1 | | 7/2006 | Lambert et al. |
| 2006/0245975 | A1 | | 11/2006 | Tipler et al. |
| 2007/0077176 | A1 | | 4/2007 | Lambert et al. |
| 2008/0289397 | A1 | | 11/2008 | Hassan et al. |
| 2010/0242579 | A1 | | 9/2010 | Tipler et al. |
| 2011/0079143 | A1 | | 4/2011 | Marotta et al. |
| 2013/0052113 | A1 | * | 2/2013 | Molins ............... B01D 53/8687 423/245.1 |
| 2014/0345370 | A1 | | 11/2014 | Marotta |
| 2015/0314267 | A1 | | 11/2015 | Schammel |
| 2016/0033462 | A1 | | 2/2016 | Singer et al. |
| 2017/0284978 | A1 | | 10/2017 | Cardin |
| 2018/0067091 | A1 | | 3/2018 | Burkhalter et al. |
| 2018/0180590 | A1 | | 6/2018 | Hall et al. |
| 2018/0246071 | A1 | | 8/2018 | Cardin |
| 2020/0033301 | A1 | | 1/2020 | Cardin |

FOREIGN PATENT DOCUMENTS

| | | |
|---|---|---|
| CN | 103499662 A | 1/2014 |
| CN | 104297386 A | 1/2015 |
| CN | 104597149 A | 5/2015 |
| CN | 104792604 A | 7/2015 |
| CN | 204630990 U | 9/2015 |
| CN | 105044244 A | 11/2015 |
| CN | 105044296 A | 11/2015 |
| CN | 107677739 A | 2/2018 |
| ES | 2311396 | 2/2009 |
| JP | 7-253421 A | 10/1995 |
| JP | 2005-283317 A | 10/2005 |
| JP | 2009-2711 A | 1/2009 |
| JP | 2009-236539 A | 10/2009 |
| JP | 2014-529080 A | 10/2014 |

OTHER PUBLICATIONS

International Search Report dated Mar. 6, 2019, for PCT Patent Application No. PCT/US2018/062327, filed Nov. 21, 2018, six pages.

Miller, B. R. et al. (Mar. 1, 2008). "Medusa: A Sample Preconcentration and GC/MS Detector System for in Situ Measurements of Atmospheric Trace Halocarbons, Hydrocarbons, and Sulfur Compounds", Analytical Chemistry vol. 80(5): 1536-1545.

Examiner's Answer to Appeal Brief received for U.S. Appl. No. 15/479,122, mailed on Apr. 7, 2020, 22 pages.

Final Office Action received for U.S. Appl. No. 15/479,122, dated Apr. 23, 2018, 14 pages.

International Search Report received for PCT Patent Application No. PCT/US2017/025993, dated Jul. 4, 2017, 5 pages.

Non-Final Office Action received for U.S. Appl. No. 15/479,122, dated Dec. 4, 2017, 12 pages.

Non-Final Office Action received for U.S. Appl. No. 15/479,122, dated Dec. 17, 2018, 13 pages.

Non-Final Office Action received for U.S. Appl. No. 16/593,934, dated Oct. 6, 2020, 9 pages.

Notice of Allowance received for U.S. Appl. No. 15/479,122, dated Mar. 24, 2021, 7 pages.

Patent Board Decision received for U.S. Appl. No. 15/479,122, mailed on Mar. 19, 2021, 7 pages.

Search Report received for Chinese Patent Application No. 201780029443.5, dated Jan. 26, 2021, 5 pages (2 page of English Translation and 3 page of Official Copy).

Supplemental Notice of Allowance received for U.S. Appl. No. 15/479,122, dated Apr. 1, 2021, 2 pages.

\* cited by examiner ated herein by reference in its entirety for all purposes and of U.S. Provisional Patent Application No. 62/727,200, filed on Sep. 5, 2018, the entire disclosure of which is incorporated herein by reference in its entirety for all purposes.

SYSTEM AND METHOD FOR REAL TIME MONITORING OF A CHEMICAL SAMPLE

CROSS-REFERENCE TO RELATED APPLICATIONS

This application claims the benefit of U.S. Provisional Patent Application No. 62/589,798, filed on Nov. 22, 2017, the entire disclosure of which is incorporated herein by reference in its entirety for all purposes and of U.S. Provisional Patent Application No. 62/727,200, filed on Sep. 5, 2018, the entire disclosure of which is incorporated herein by reference in its entirety for all purposes.

FIELD OF THE DISCLOSURE

This relates to systems and methods of preconcentrating a chemical sample and, more particularly, to a system with multiple traps of different kinds for preconcentrating and separating various compounds of a chemical sample into separate sample streams for analysis by gas chromatography.

BACKGROUND OF THE DISCLOSURE

The analysis of volatile chemicals in air or other matrices at low to sub-PPB levels can require the preconcentration of the sample prior to injection into a Gas Chromatograph (GC), because most detectors are not sensitive enough to analyze chemicals at the sub-PPB level. Volatile chemicals can be measured in outdoor and indoor air to determine the risk they impose on the human population living in those areas. In addition, many of these compounds may react with oxides of Nitrogen (NOx) in the presence of sunlight to create photochemical smog such as Ozone. Comprehensive monitoring of VOCs is becoming more common world-wide for both of these reasons. The typical range of concern starts as low as 0.001PPBv for some compounds depending on their toxicity, carcinogenic properties, or their influence on Ozone creation rates. In order to detect compounds at these concentrations, a sample having a volume in the range of 0.2-1 liters may be preconcentrated resulting in a final volume in the range of 2-100 microliters prior to introduction into a GC capillary column. This preconcentration can allow the sample to be injected at a rate that is fast enough to achieve high chromatographic resolution using low flow capillary GC systems.

The challenge in the past has been to develop preconcentration systems and analyzers that are able to recover compounds as light as Ethane, Ethylene and Acetylene (C2 hydrocarbons) while being able to also recover heavier compounds such as C12 hydrocarbons (n-Dodecane and others) with good precision, without using cryogenic or electronic cooling. In other words, it is required in many situations to preconcentrate and analyze samples including compounds that have a boiling point range of −90° C. to 230° C. Many approaches to trapping this range of compounds involve cooling the traps below sub-ambient temperatures in order to increase the adsorptive strength of each trap. In general, adsorbents become roughly ten times stronger for every 35° C. they are cooled down, so cooling an already strong trap to sub-ambient temperatures makes them even stronger. Unfortunately, in some situations, cooling the traps in this way may not allow water vapor to pass through these traps. In most cases, most of the water must be eliminated prior to injection into a capillary GC because normal water concentrations of 0.5-3% in air (5-30 million PPB) can be too high to be handled by GCMS systems, as the performance of both the capillary column and the mass spectrometer detector can be negatively affected. That is, the concentration of water vapor in air can overload the GC column and can create signal suppression in the mass spectrometer. Additionally, the water must be removed without loss of polar or non-polar VOCs of interest in most situations.

Some approaches for measuring C2-C12 Hydrocarbons during real time analysis in the field can use complicated electronic cooling which may not permit the elimination of water vapor. To remove excess water vapor, some systems can pass the initial air sample through a membrane that can absorb and eliminate most of the water. Unfortunately, this approach may also eliminate polar VOCs, such as those containing oxygen (Alcohols, Ketones, Aldehydes, Esters, etc.), so these analyzers may be unable to measure some of the toxic chemicals found in air, and they may not recover all compounds that have an influence on Ozone formation rates in urban air. This can prevent these polar VOCs (PVOCs) from being measured accurately during real time monitoring, which is problematic as PVOCs can account for up to half of the total VOC inventory in some locations.

Some water removal systems use electronic cooling to selectively freeze out the water by cooling a first trap to about −30° C. which removes most of the water by reducing the sample stream to a dew point of −30° C. Trapping of the VOCs then occurs on a second stage trap containing multiple adsorbents also at −20 to −30° C. Unfortunately, these systems can take too long to cool back down after sample injection and bakeout to perform real-time analysis with a single preconcentration system, so these systems must use two separate systems where one is injecting, baking, and cooling while the other system is trapping the sample. Unfortunately, this adds significantly to the cost, and makes it harder to obtain good system precision as two separate systems are alternately generating the data, potentially requiring separate calibrations to be performed for both systems.

Many real-time analyzers-use two Flame Ionization Detectors (FIDs) and two separate columns in the GC to measure the C2-C12 Hydrocarbons, without the use of a mass spectrometer to confirm compound identities. The identification of each compound relies on maintaining a consistent time of elution (Retention Time—RT) for each compound. Unfortunately, many air samples can include thousands of VOCs whose concentrations can vary widely based on the proximity of chemical refineries that produce lighter boiling precursors for today's plastics and synthetics. Without the use of mass spectrometry to identify and isolate the target VOCs from other interfering compounds, systems that rely on dual FID analyzers can suffer from positive bias as compounds are misidentified.

SUMMARY OF THE DISCLOSURE

Some embodiments of the disclosure are directed to systems and methods including gas chromatography for the analysis of chemical samples, such as chemical samples including volatile organic compounds (e.g., compounds with boiling points between −100° C. to 250° C.). Additionally, some embodiments of the disclosure may analyze a range of compounds without cryogenic or electronic cooling of the component parts of those embodiments. Some embodiments of the disclosure include a Multi-Capillary Column Trapping System (MCCTS) that can include multiple capillary columns arranged in increasing strength (i.e., chemical affinity for particular compounds of interest). In some embodiments, however, MCCTS may not adequately trap the lightest compounds of interest in air, such as C2 Hydrocarbons boiling at about −90° C., and Formaldehyde when sampling large volumes needed for reaching detection limits (typically 200-400 cc). Thus, some embodiments of the disclosure also include one or more packed traps and/or capillary columns in addition to one or more MCCTS. The packed and capillary columns of these embodiments can fluidly couple to the MCCTS and can capture (or trap) the compounds that the MCCTS may not adequately retain (e.g., C2 Hydrocarbons and Formaldehyde). These systems may include additional columns to facilitate the removal of water vapor from the organic compounds of interest (e.g., C2 Hydrocarbons and Formaldehyde). Moreover, these systems can include two or more different detectors to detect different categories of compounds. For example, the system can include a flame ionization detector and/or photoionization detector to detect compounds such as C2 Hydrocarbons and Formaldehyde and a mass spectrometry detector to detect C3-C12 Hydrocarbons. Other detector types, such as pulsed discharge detectors or acoustic detectors are possible.

The embodiments described in this application include numerous advantages over other systems and techniques of conducting chemical analysis by gas chromatography. For example, all traps and oven temperatures can be operated at 35° C. or higher, eliminating the need for cryogenic or electronics cooling. The use of MCCTS can eliminate many of the deficiencies in prior art systems using packed traps for concentrating C2-C12 compounds. For example, MCCTS can eliminate channeling that occurs due to expansion and contraction of sorbent in packed traps. Using much smaller adsorbent particles in the capillary traps of MCCTS can cause MCCTS to release chemicals faster as well as clean up faster after each analysis. This can be particularly important for the rapid injection and cleanup of the heavier VOCs in the mixture. Thus, the MCCTS can facilitate rapid system cleanup (i.e., reset), with far less carryover than that of systems using packed traps. Finally, dual passivated stainless steel vacuum canisters can be used to collect real time air samples at a substantially constant rate, alternating with each vacuum canister collecting one hour samples. Substantially constant sampling may lead to more accurate results despite any time spent baking and cooling down traps between analyses. Each canister can collect sample for an hour when doing hourly analysis, which is an advantage relative to systems that trap the sample directly and do not initially collect the sample in a canister as these systems can only sample for 15-30 minutes each hour due to the requirement to desorb, bake out and cool the traps back down prior to the next sample preconcentration. In the system described here, one canister can be sampling for an hour while the other canister can be analyzed and re-evacuated in preparation for the next one hour sampling event. Moreover, the system can be used in a stationary laboratory where whole air samples are collected and delivered to the lab using inert vacuum sampling containers. And some embodiments can operate in a mobile lab that can be driven to the location where air analysis will be performed. Finally, the system can be used for continuous monitoring of air at permanent or semi-permanent monitoring stations, testing for hundreds of compounds at 0.001 PPB to PPM levels, including some compounds designated in the US 1990 Clean Air Act Amendment.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

Figure 1:
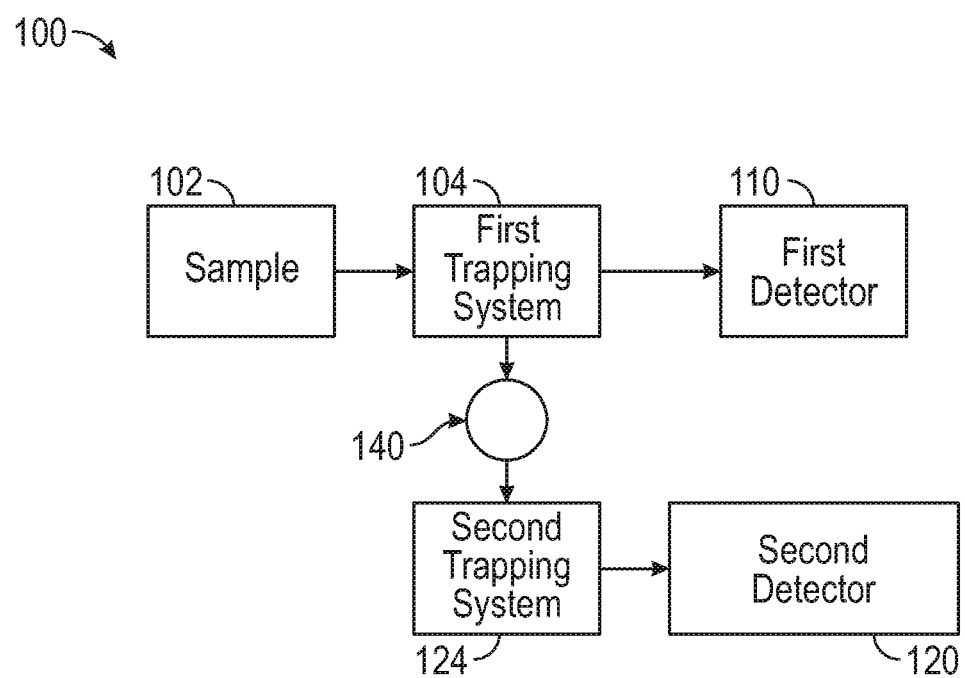
FIG. 1 illustrates an exemplary block diagram of a system 100 for preconcentrating and analyzing various compounds in a chemical sample by gas chromatography according to one example of the disclosure.

FIG. 1 illustrates an exemplary block diagram of a system 100 for preconcentrating and analyzing various compounds in a chemical sample by gas chromatography according to one example of the disclosure. The system 100 of FIG. 1 includes a sample 102, a first trapping system 104, a first detector 110, a second trapping system 124, and one or more second detector(s) 120. In some embodiments, additional or alternative components are possible. Further, system 100 can be modified to include one or more of the components described below with reference to FIGS. 2A-C.

In the system 100 illustrated in FIG. 1, sample 102 comprises a gas input (passed into) the system 100. For example, as described in greater detail with reference to FIG. 2A below, the system 100 can select an input from a variety of different gas inputs, and the sample 102 can refer to a single selected gas input to system 100. More specifically, the system 100 can select a gas sample 102 held (i.e., collected) in a vacuum canister. As also described in greater detail below, the system 100 can be designed to select from at least two such samples (e.g., to enable real-time or continuous sampling). As can be appreciated by one of skill in the art, existing vacuum systems can collect samples of ambient air (i.e., gas samples) into more than one inert vacuum canister at a constant flow rate to facilitate continuous (or approximately continuous) sampling. For example, the system 100 is capable of operating in conjunction with two vacuum canisters (or vacuum systems), not shown in FIG. 1, to collect sample 102 as an average collected into the canisters over a predefined period of time (e.g., one hour). Further, the system 100 can conduct an analysis according to a user defined schedule (e.g., hourly) by collecting a first real time sample during a first time period (e.g., a first hour) at a constant flow rate. Then, during the following (second) time period (e.g., a second hour), the system 100 can collect a second real time sample, also at a constant flow rate, while the system 100 analyzes the first real time sample that it collected during the first time period. After the system 100 analyzes the first real time sample, it can evacuate the first vacuum canister and it can, based on user instructions, begin to collect a third real time sample over a third time period (e.g., a third hour), possibly while the system analyzes the second real time sample that is collected during the second time period (or second hour). And as one skilled in the art can appreciate, the system 100 could be programmed to collect and analyze samples (i.e., by gas chromatography)

with a delay between subsequent analyses or with time periods that are greater than one hour (e.g., 2, 3, 4, 6, or 8 hours, and the like).

Thus, the system 100 can collect a sample 102 that accounts for (e.g., is an average that includes) even short-term fluctuations in the concentrations of volatile organic compounds in the sampled air mass while the system 100 collects sample 102 during the user-defined timer period (e.g., an hourly average). In other words, a user may program the system 100 with an analysis frequency (i.e., a time period for collecting samples) greater than, or less than, one hour. For example, instead of sampling an average concentration every hour, the system 100 is also able to analyze the sample 102 once every 2, 3, 4, 6, 8, or 12 hours or longer. And because the real time samplers are still collecting for the entire integration period (e.g., over six consecutive hours) a true average of the concentration of chemicals in the air over any suitable integration period can be obtained. And, as can be appreciated, an increase in the duration of the integration period can correspond to a decrease in the total amount of GC analysis required (i.e., the analysis occurring at the end of each integration period). As appreciated in the art, components for gas chromatography may work for a limited amount of time before those components require maintenance (i.e., down-time). Therefore, collecting sample 102 in collection devices (e.g., vacuum canisters) to allow the system 100 to operate with fewer total gas chromatography analyses over a specified period of time extends the time that the system 100 can operate before it requires routine maintenance (i.e., down-time).

As illustrated in FIG. 1, system 100 can further include a first trapping system 104. As described in more detail below with reference to FIGS. 2-3, the system 100 includes first trapping system 104 to retain (capture) a specific group of compounds (e.g., C3-C12 hydrocarbons) in the sample 102 and to analyze those compounds it retains by gas chromatography. As is also described in greater detail below with reference to FIG. 2A, embodiments of the first trapping system 104 include two or more multi-capillary column traps to retain a subset of the compounds that may be present in the sample 102. For example, based on the composition of the air (or other gas) sampled by the system 100, the sample 102 can include C3 hydrocarbons and heavier compounds (e.g., C3-C12 hydrocarbons) that the first trapping system 104 retains. And the sample 102 can further include lighter compounds (e.g., C2 hydrocarbons, Formaldehyde or water vapor) that pass through the first trapping system 104. Thus, if the sample 102 includes C3-C12 hydrocarbons, the first trapping system 104 can separate the sample 102 (i.e., separates the compounds of interest within the sample 102) into two groups; and retains a group of compounds in the sample 102 (e.g., C3-C12 hydrocarbons) and communicates the rest of the sample 102 (e.g., water vapor, C2 hydrocarbons, and Formaldehyde) downstream for gas chromatography analysis in the second trapping system 124.

As shown in FIG. 1, the first trapping system 104 is fluidly coupled to a first detector 110. As described in greater detail with reference to FIG. 2A below, the first trapping system 104 preconcentrates the compounds it retains from the sample 102 to facilitate the analysis of the distribution of those retained compounds by gas chromatography. So the system 100 shown in FIG. 1 can include a gas chromatography focusing column (not shown), either as part of the first trapping system 104, or between the first trapping system 104 and the first detector 110. The first detector 110 can receive the compounds retained by the first trapping system (e.g., C3-C12 hydrocarbons) as part of a gas chromatography analysis of those compounds. And as can be appreciated by one of skill in the art, gas chromatography analysis of the compounds retained by the first trapping system 104 can include a preconcentration phase to facilitate optimal (rapid) transfer of the compounds to the first detector 110. That is, the first trapping system 104 can pass the compounds it retained from the sample 102 through a focusing trap before they are transferred to the first detector 110 for chemical analysis by gas chromatography. Examples of the first detector 110 of the system 100 include a Mass Spectrometry detector. The system 100 can further include a chemical separation column, such as a GC column in the flow path between the first trapping system 104 and the first detector 110. Because the water vapor and bulk gases may not be retained by the first trapping system 104, these compounds do not enter the first detector 110 during gas chromatography analysis of the compounds that the first trapping system 104 retained from the sample 102 (e.g., the C3-C12 hydrocarbons).

The exemplary system 100 further includes a second trapping system 124, as will be described in more detail below with reference to FIGS. 2-3. In many embodiments, the second trapping system 124 traps (retains) and preconcentrates the lighter compounds of the chemical sample for gas chromatography analysis, such as C2 hydrocarbons and Formaldehyde. Additionally, one or more other compounds such as water and bulk gas can pass through part of the first trapping system 104 to enter the second trapping system 124. The second trapping system 124 separates the non-polar sample compounds, such as the C2 hydrocarbons, from the polar compounds, such as Formaldehyde and water vapor, and can transfer the C2 hydrocarbons to a second column (e.g., the PLOT column 222B described in detail below with reference to FIG. 2B) without also transferring a substantial portion of the water vapor. During the transfer of the C2 hydrocarbons to the second column (e.g., PLOT column 222B of FIG. 2B below) the C2 hydrocarbons (e.g., Ethylene, Acetylene, and Ethane) can separate from one another (i.e., resolve into separate chromatography peaks) so that when they ultimately elute from the second column (e.g., PLOT column 222B of FIG. 2B), they can be measured separately from one another. The transfer of C2 hydrocarbons through the polar column to the second column can stop before elution of the C2 hydrocarbons. Then the second trapping system 124 separates the water vapor (or most the water vapor) from the other polar compounds (e.g., Formaldehyde), so the water vapor can be expelled from the system 100. The second trapping system 124 can then transfer the remaining polar compounds (e.g., Formaldehyde) to the second column (i.e., PLOT column 222B of FIG. 2B). The system 100, or the second trapping system 124, can preheat the second (strong) column (not shown in FIG. 1) and after a desorption temperature is attained, transfer the compounds of interest (e.g., C2 hydrocarbons and Formaldehyde) from the second column to the second detector 120, with the three C2 hydrocarbons and Formaldehyde being separated (resolved) from one another so they can be measured accurately. As can be appreciated by one skilled in the art, the second detector can be any appropriate detector for performing gas chromatography such as a flame ionization detector. In one example, however, the second detector 120 includes a photoionization detector (PID) in series with a flame ionization detector such that the compounds transferred to the second detector 120 first enter the PID and then the FID (according to the series configuration of the two detectors). In some examples, Pulsed Discharge Detectors (PDD), Acoustic Detectors, or other detectors may also be used to optimize sensitivity and quantitation. Moreover, in some embodiments the second detector 120 may include a focusing column before one or more detectors.

Thus, the second trapping system 124 can transfer the C2 hydrocarbons to the second detector 120 to perform chemical analysis of those compounds without allowing the water vapor to enter the second detector 120.

Thus, system 100 can be used to perform separate chemical gas chromatography analyses of a sample separated into different streams, such as C3 hydrocarbons and heavier compounds, C2 hydrocarbons (e.g., Ethane, Ethylene, and Acetylene), and Formaldehyde while also preconcentrating these sample streams and removing bulk gases and water vapor from the sample. Another example of the disclosure (or the disclosure according to another embodiment) including a gas chromatography system 200, a first trapping system 204, a second trapping system 224, and a system 200 including the first trapping system 204 and the second trapping system 224 and operation of these systems are described in more detail below with respect to FIGS. 2-3.

Figure 2A:
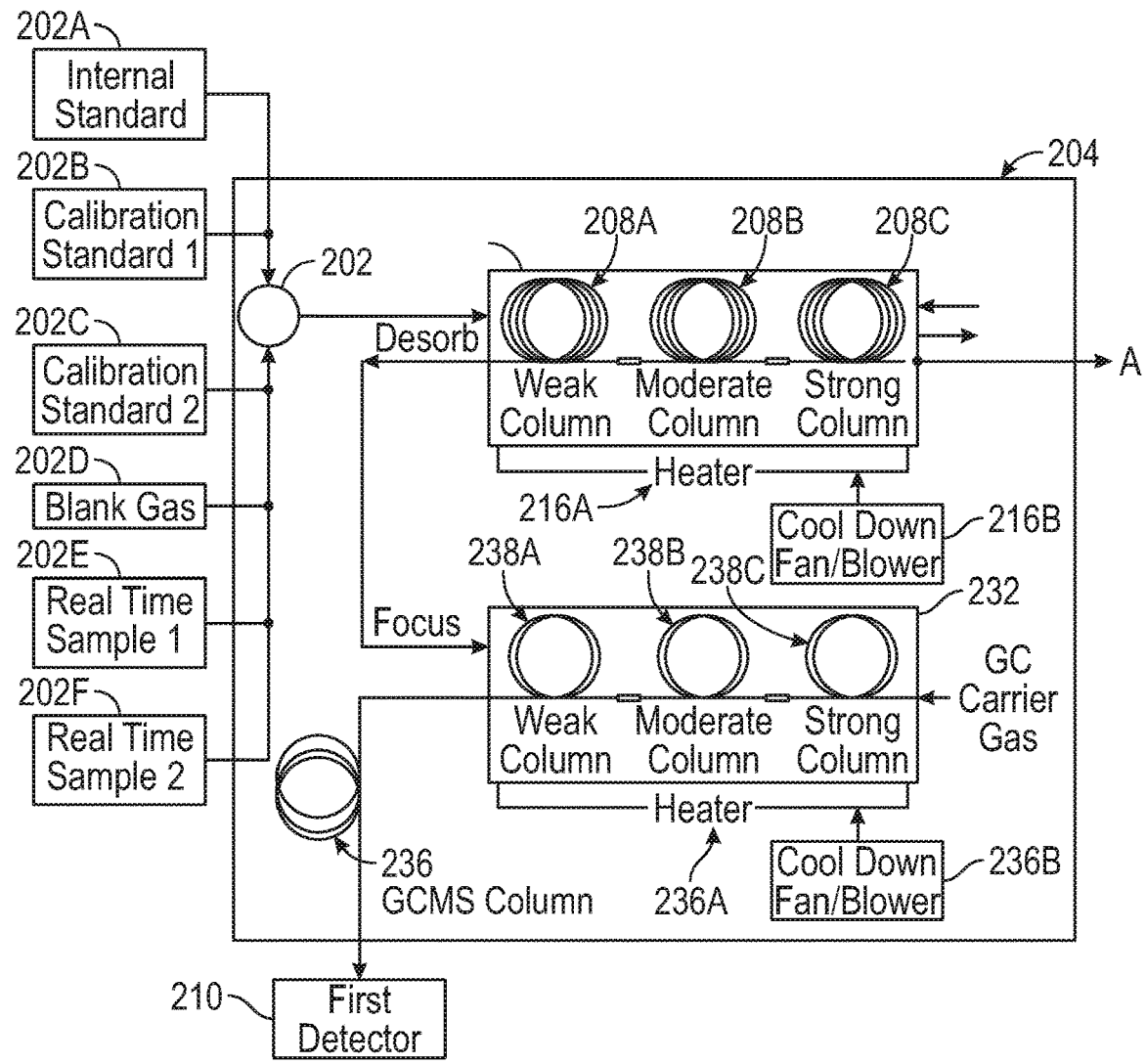
FIG. 2A illustrates one example of a first trapping system 204 according to the disclosure.

FIG. 2A illustrates one example of a first trapping system 204 according to the disclosure. The first trapping system 204 shown in FIG. 2A includes a first multi-capillary column trap 212 and a second multi-capillary column trap 232. The exemplary first trapping system 204 shown in FIG. 2A further includes a chemical separation column 236 and a first detector 210. The first trapping system 204 illustrated in FIG. 2A, and other embodiments of a first trapping system that may differ somewhat from the example shown in FIG. 2A without departing from the scope of the disclosure, can be similar to first trapping system 104 described above with reference to FIG. 1.

As shown in FIG. 2A, the exemplary first trapping system 204 includes a multi-way stream select valve as its sample source 202. The sample source 202 is switchably couplable to multiple sample streams, such as internal standard 202A, a first calibration standard 202B, a second calibration standard 202C, a blank gas 202D, a first real-time sample 202E, and a second real-time sample 202F. Additional or alternate streams are possible. As a specific example, the first real-time sample 202E can be stored in a cylinder or vacuum canister, and the other streams coupled to select valve 202 could likewise be stored samples or standards or input from some other means.

The first trap 212 and the second trap 232 can each include a plurality of capillary columns 208A-C and 238A-C that can be configured to trap a subset of chemical compounds within a sample. For example, each of the capillary columns 208A-C and 238A-C of the first and second multi-capillary column traps 212 and 232 can be internally coated by a sorbent that retains one or more compounds of a chemical sample.

A capillary column can be an "open tubular" structure (e.g., a tube) for use in GC and/or GCMS that has adsorbent (e.g., small adsorbent particles or a thin film polymer) coating its internal walls. The strength of a capillary column corresponds to its affinity (or tendency) to adsorb one or more compounds within a sample allowed to flow through the column. For example, a low strength capillary column has a relatively low affinity to adsorb or absorb one or more compounds within sample. And contrastingly, a high strength capillary column can have relatively high affinity to adsorb or absorb one or more compounds within the same (or substantially similar) sample. The strength of a capillary column can be a function of one or more of its physical characteristics (e.g., its length, its inner diameter, the adsorbent coated on its inner walls, etc.).

As shown in FIG. 2A, the first trap 212 can include a weak column 208A, a moderate column 208B, and a strong column 208C coupled to one another in series. Other numbers of capillary columns are possible. The columns 208A-C are fluidly coupled in order of increasing chemical affinity to one or more compounds of a chemical sample, though it is understood that fewer or more columns of sequentially increasing chemical affinity (i.e., strength) can be used in other examples of the disclosure. The system 200 can include stronger columns (e.g., 208C and 238C) to retain the lighter compounds of a sample; the strong columns, however, may not readily (or completely) release the heavier compounds in a sample. So, the system 200 can include one or more columns that are weaker relative to the stronger columns that can be used in front of the stronger columns (i.e., relative to the direction in which a sample flows when first input to system 200) to trap heavier compounds in the weaker columns and prevent (or reduce) the heavier compounds that may be otherwise trapped by the stronger columns. This arrangement in system 200, of weak columns filtering heavier compounds from inputs to stronger columns, can facilitate recovery of heavier compounds during desorption (e.g., when desorption gas flows in the direction opposite to the direction the sample travelled during trapping).

Similarly, the second trap 232 includes a weak column 238A, a moderate column 238b, and a strong column 238C arranged in a manner similar to the columns 208A-C of the first trap 212. Each of the columns 208A-B and 238A-C of the first and second traps 212 and 232 can vary from 0.1 meters in length to several (e.g., two, three or five) meters in length. Weak column 208A can be a 0.53 mm ID 100% polydimethylsiloxane column, moderate column 208B can be a 0.53 mm ID Porous Layer Open Tubular (PLOT) Q column (e.g., 0.5 to 2 meters in length), and strong column 208C can be a 0.53 mm ID carbon molecular sieve PLOT column (e.g., 0.1 to 4 meters in length). The first and second traps 212 and 232 can include capillary columns 208A-C and 238A-C that have relatively small inner diameters (e.g., 0.021" or less).

These column details are provided by way of example only, and it is understood that additional or alternative columns can be used in accordance with the examples of the disclosure. For example, column 208C (e.g., the strongest column in trap 204) can be a very strong PLOT column such as a carbon molecular sieve. In general, one or more of columns 208 can be Polymer based Wall Coated Open Tubular (WCOT) columns or Porous Layer Open Tubular (PLOT) columns. In some embodiments, the columns within trap 204 and trap 232 can be fluidly coupled together using GC column unions, such as glass press fit unions or any low volume connection.

The first trap 212 further includes heater 216A, which can be any suitable device for heating (or otherwise controlling the temperature of) the capillary columns 208A-C within the first trap 212. For example, capillary columns 208 can be contained within an oven or a mandrel (e.g., aluminum or copper) to allow for consistent temperatures of the columns 208A-C whether trapping compounds (e.g., at a cool temperature, such as 20-50° C.) or back desorbing compounds (e.g., at a hot temperature, such as 100-300° C.) during cleaning or for sample analysis. Heating may be performed by passing an electrical current through a resistive coating or sleeve on the columns or by wrapping heating wire around the columns. Alternatively, the columns 208A-C can be heated by configuring the mandrels of columns 208A-C in physical contact (i.e., thermally coupling them) with a heating plate. In some examples, heater 216 can include an external fan or blower 216B than can reduce the temperature of the oven (and thus trap 204 and/or columns 208A-C) to ambient temperatures (e.g., 25° C. or 35° C.) or lower.

As illustrated in FIG. 2A, the first trapping system 204 can be fluidly coupled to a chemical separation column 236, such as a GC column, and a first detector 210, such as an MS detector. The chemical separation column 236 and first detector 210 can receive the sample concentrated by the first trapping system 2A.

As shown in FIG. 2A, the first trap 212 fluidly couples to the sample source 202 and to the second trap 232 at a first end that is proximate to the weak column 208a of the first trap 212. Thus, during a first trapping stage, the sample flows in a first direction from the weak column 208a towards the strong column 208C (e.g., through the first trap 212 from left to right as illustrated in FIG. 2A). During this first trapping stage, some of the compounds of the sample (e.g., C2 hydrocarbons, Formaldehyde, bulk gases, and water) are not retained by the first trap 212. The compounds not retained by the first trap 212 are able to exit the first trap 212 for further analysis and for removal of bulk gases and water vapor using a different trapping system, such as second trapping system 124 or 224 described with reference to FIGS. 1 and 2B-2C. The compounds that the first trap 212 does retain, however, (e.g., C3-C12 hydrocarbons) can be focused by the first trapping system 204 and analyzed by the first detector 210 as will now be described.

During a desorption process, the compounds that were retained by the first trap 212 are able to flow in the reverse direction from the strong column 208c towards the weak column 208a and into the second trap 232. Similarly, the compounds are able to flow in a direction from the weak column 238a of the second trap towards the strong column 238c of the second trap 232 during trapping and are able to flow in the opposite direction during desorption. This process reduces the bandwidth of the sample compounds to improve the sensitivity of the chemical analysis results.

After desorbing the compounds from the second trap 232, the compounds can be rapidly injected into the chemical separation column 236 and then into the first detector 210 for chemical analysis. The first trapping system 204 and the second trapping system 224, described below with reference to FIGS. 2B-C, can process different sets of compounds in a substantially simultaneous fashion. For example, while the first trapping system 204 and the first detector 210 process (e.g., trap, detect, and analyze) one set of compounds, the second trapping system 224 and the second detector(s) 220 can process (e.g., trap, separate, concentrate, or analyze) the other compounds of the sample that were not retained by the first trapping system 204 as described below with reference to FIGS. 2B-2C.

Figure 2B:
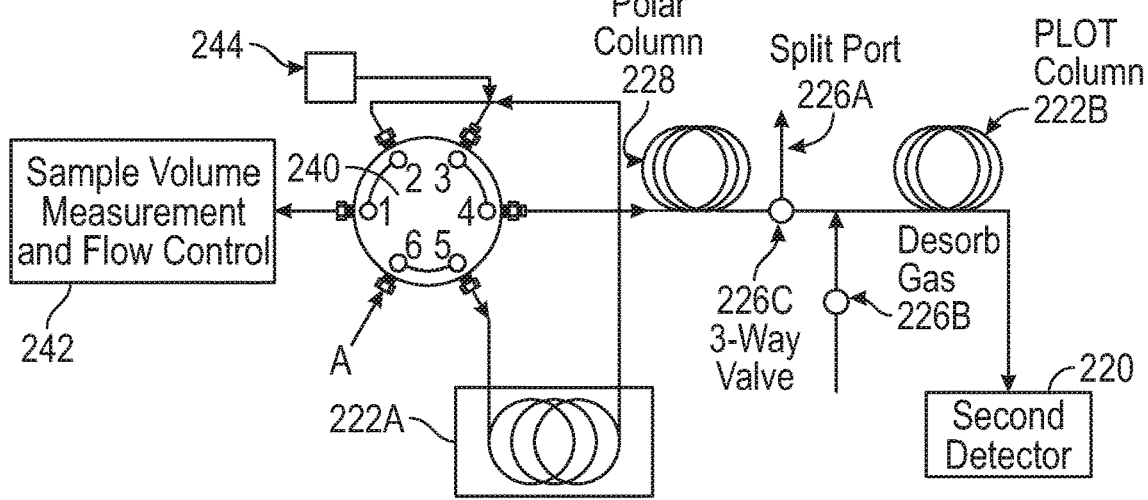
FIG. 2B illustrates an exemplary second trapping system 224 according to the disclosure.

FIG. 2B illustrates an exemplary second trapping system 224 according to the disclosure. The second trapping system 224 includes a valve system 240, pressure/flow controllers 242 and 244, a packed trap 222A, a polar column 228, an input port A (coupled to an output of the first trapping system 104 or 204 described in greater detail with reference to FIGS. 1-2A), a split port (or split vent) 226A, a PLOT column 222B, a desorption gas valve 226B, a 3-way valve 226C coupled to the polar column 228, the split port 226A, and the PLOT column 222B, and one or more second detectors 220. Additional or alternative components are possible.

The exemplary second trapping system 224 illustrated in FIG. 2B is configured to trap, preconcentrate and analyze light compounds (e.g., C2 hydrocarbons and Formaldehyde) that may include greenhouse gases (e.g., Fluorocarbons and Chlorofluorocarbons) with a low boiling point (e.g., −50° C. to −100° C.). Thus, the gas that enters inlet port A should be filtered (e.g., using first trapping system 104 or 204 or another suitable filter) before being allowed to enter the second trapping system 224.

As illustrated in FIG. 2B, the valve system 240 can include a valve capable of controlling the fluid coupling, and fluid flow between the first trap 212 of the first trapping system 204, the packed trap 222A, the polar column 228, and the volume/flow controllers 242 and 244, thereby controlling the flow of the sample (or part of the sample) into and out of various stages of system 200. For example, the valve system 240 includes or is a rotary valve having a LOAD position in which positions 1 and 2 are connected and an INJECT position in which positions 2 and 3 are connected. While the valve system 240 is in the LOAD position, sample (e.g., the light compounds of a sample such as C2 hydrocarbons and Formaldehyde) can be transferred from the first trap 212 of the first trapping system 204 to the packed trap 222A and while the valve system 240 is in the INJECT position, sample can be transferred out of the packed trap 222A towards the polar column 228 and the PLOT column 222B. Moreover, the valve system 240 can be a rotary valve configured to facilitate the flow of fluid through the second trapping system 224 (e.g., to perform a trapping process at the packed trap 222A with valve system 240 in a LOAD position, and to perform a desorption process from packed trap 222A with the valve system 240 in an INJECT position), as described in greater detail below with reference to FIG. 2C.

As described above, the second trapping system 224 can include a packed trap 222A. In some embodiments of the disclosure, the packed trap 222A can be a high capacity C2/CH2O trap. That is, the packed trap 222A can contain a strong adsorbent that can retain those chemical compounds (e.g., C2 hydrocarbons and Formaldehyde) not retained by the first trapping system 204 described with reference to FIG. 2A above. So, packed trap 222A may be able to trap 200-500 cc of sample or standard gas without loss of the C2 hydrocarbons or Formaldehyde that the sample may contain and allowing enough volume of the sample to reach required detection limits for these compounds.

Further, the exemplary second trapping system 224 illustrated in FIG. 2B includes a polar column 228, such as an ionic liquid column or other gas chromatography column with suitable retention characteristics for polar compounds. The polar column 228 is able to substantially retain polar compounds present in a sample (e.g., Formaldehyde and water vapor) and, at substantially equal operating temperature, substantially pass (i.e., not retain) non-polar compounds (e.g., C2 hydrocarbons). The polar column 228 can be between approximately 5-30 meters in length, with an internal diameter of approximately 0.25 to 0.53 millimeters (e.g., approximately 0.32 millimeters).

As also mentioned above, the second trapping system 224 can include a PLOT column 222B with a relatively strong (e.g., high chemical affinity) sorbent to retain compounds of interest and focus the compounds prior to detection via a second detector 220 (e.g., flame ionization detector and/or a photoionization detector). In some embodiments, the PLOT column 222B is a strong carbon molecular sieve or Carboxen PLOT column. The PLOT column 222B can be approximately 10 meters in length and can have an internal diameter of approximately 0.53 millimeters. One end of the PLOT column 222B can be fluidly coupled with the second detector(s) 220.

The second trapping system 224 can also include a 3-way valve 226C as shown in FIG. 2B. The 3-way valve 226C can be a 3-way solenoid valve that can operate to selectively connect the polar column 228 with the PLOT column 222B or to connect the polar column 228 with the split port 226A.

Additionally, the system can include a flame ionization detector and/or a photoionization detector as the second detector(s) 220 and it can receive (and measure) the compounds from the PLOT column 222B during a desorption process. The one or more second detector(s) 220 can be a photoionization detector in series with a flame ionization detector. In many situations, the flame ionization detector can detect C2 hydrocarbons with high reliability and the photoionization detector can detect Formaldehyde with high reliability. Thus, it should be appreciated that "the second detector(s) 220" refers to one of these detectors, the two of these detectors arranged in series, or some other detector suitable to detect the compounds of interest in a particular sample.

The packed trap 222A can be fluidly coupled to the polar column 228 through valve system 240 or a switching valve, using Dean Switching or according to other valve switching techniques and configurations. For example, during desorption, a six-port two-position switching valve can operate to place one end of the packed trap 222A in fluid communication with a one end of the polar column 228. Thus, during a desorption process of the second trapping system 224; one or more compounds can be transferred from the packed trap 222A to the polar column 228 and the PLOT column 222B. During this time, the 3-way valve 226C can open the flow path between the polar column 228 and the PLOT column 222B while closing the path between the polar column 228 and the split port 226A.

With the valve system 240 and the 3-way valve 226C configured as described above and after preheating the packed trap 222A, desorption gas is able to flow through the packed trap 222A while heating continues to a specified temperature (e.g., a desorption temperature in the range of 100-300° C.) and compounds retained by the packed trap 222A are able to flow toward the polar column 228. One or more polar compounds of the sample can be retained by the polar column 228, while the non-polar compounds can move on to the PLOT column 222B and separate from each other after entering the PLOT column 222B, which can fluidly couple to the polar column 228 via a 3-way valve 226C. Compounds that enter the PLOT column 222B can slow down (flow through the column 222B at a slower rate than before entering it) and resolve or separate within the PLOT column 222B.

The system 224 may further include a split port (or split vent) 226A disposed between the polar column 228 and the PLOT column 222B and capable of fluid communication with the polar column 228 via the 3-way valve 226C (e.g., based on the operation of the 3-way valve 226C). The split port 226A can facilitate a process to purge water vapor from the polar column 228. Relatedly, some embodiments of the disclosure may include a desorption gas valve 226B to selectively flow desorption gas into one end of the PLOT column 222B to transfer the compounds of interest from the PLOT column 222B and toward the second detector 220 (i.e., to perform a desorption and detection process at the PLOT column 222B).

Thus, the exemplary second trapping system 224 can be used to preconcentrate and perform analysis of one or more sample compounds and to remove water vapor and bulk gases from the system. For example, the split port 226A can fluidly couple with the polar column 228 (e.g., by opening the 3-way valve 226C between the two and closing the 3-way valve 226C at the PLOT column 222B) after the non-polar C2 hydrocarbons have completely or substantially passed through the polar column 228 to the PLOT column 222B (or, in some embodiments, have been further transferred to the second detector 220). The polar column 228 can then be heated slightly to a flush temperature between 40° C. and 60° C. while fluidly coupled to the split port 226A to substantially or fully purge water vapor from the polar column 228. The polar column 228 is able to retain Formaldehyde when heated to a temperature in the range of 40° C. to 60° C., thus allowing the water vapor to be purged from the system 224 without loss of the ability to detect Formaldehyde in the chemical sample. As described in greater detail with reference to FIG. 3 below, after water removal, the system 200 can restore fluid communication between the polar column 228 and the PLOT column 222B by turning (i.e., toggling) the 3-way valve 226C to enable the system 200 to transfer the polar compounds (e.g., Formaldehyde) from the polar column 228 to the PLOT column 222B (i.e., to retain the remaining polar compounds with the C2 Hydrocarbons on the PLOT column 222B) before a desorption processes (transfer), detection and analysis of all compounds on (or present within) the PLOT column 222B. In some examples of the system 200, the C2 hydrocarbons separate as they pass through the PLOT column 222B (e.g., Acetylene, Ethylene, and Ethane pass through at different rates). After the system 200 transfers the remaining polar compounds (e.g., Formaldehyde) to the PLOT column 222B, the system 200 can pre-heat the PLOT column 222B with substantially no flow occurring through the PLOT column 222B until after it is heated to a desorb temperature. Once the PLOT column 222B is heated to a desorb temperature, the system 200 can open the Desorb Gas valve 226B to flow desorb gas to rapidly (i.e., according to the manner of the flow from desorb gas valve 226B) deliver the completely separated C2 Hydrocarbons and Formaldehyde to the one or more second detector(s) 220. The rapid transfer of both C2 hydrocarbons and Formaldehyde can increase the concentration of each compound in the second detector(s) 220 (i.e., to increase the resulting signal intensity), but can also reduce the peak width to produce very narrow peaks—a goal for most capillary GC systems.

Figure 2C:
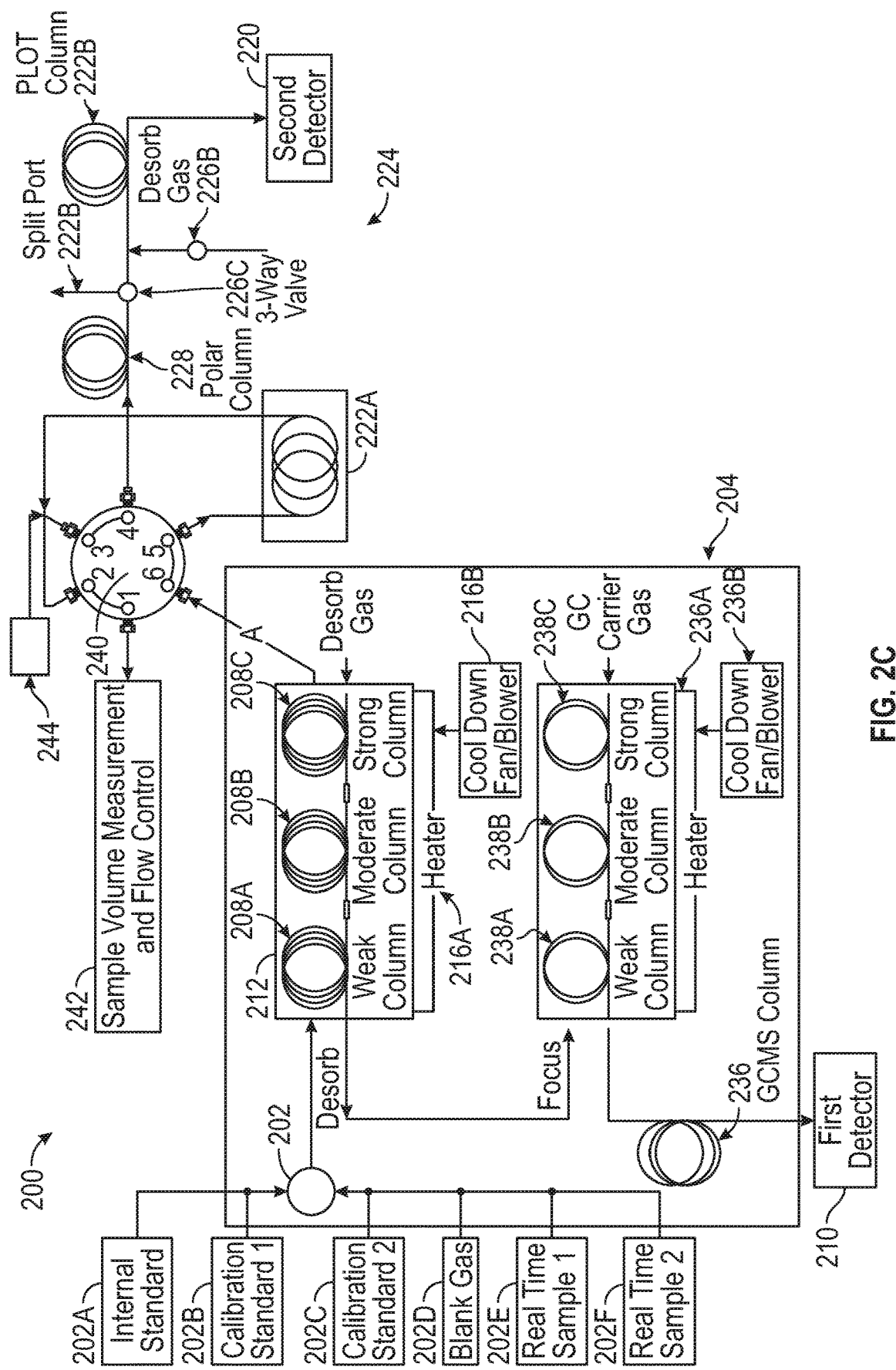
FIG. 2C illustrates an exemplary system 200 for preconcentrating and analyzing one or more groups of compounds within a chemical sample according to the disclosure.

FIG. 2C illustrates an exemplary system 200 for preconcentrating and analyzing one or more groups of compounds within a chemical sample according to the disclosure. As shown in FIG. 2C, the system 200 includes a first trapping system 204 (described in greater detail with reference to FIG. 2A above), a first detector 210 (or first chemical analysis device), a second trapping system 224 (described in greater detail with reference to FIG. 2B above), one or more second detector(s) 220 (or second chemical analysis device) including a packed trap 222A, a switching valve 240, a pressure control system 244, an polar column 228, a split port 226A, a desorption gas valve 226B, a 3-way valve 226C and a PLOT column 222B. The system 200 can further include one or more processors (e.g., controllers, microprocessors, computers, computer systems, etc.) (not shown) running software and/or instructions housed on a non-transitory computer-readable medium for controlling the operation of one or more components of the system 200. Moreover, as can be appreciated by one skilled in the art, the system 200 may include one or more processors configured to control the operation of certain components within system 200, such as the valve system 240, the 3-way valve 226C and the desorption gas valve 226B, along with any other component of the system 200.

As shown in the figures, the system 200 includes a multi-channel stream select valve 202 to select between various fluid inputs to flow into the system 200 (e.g., into one end of the first trap 212 of the first trapping system 204). The inputs include an internal standard 202A, a first calibration standard 202B, a second calibration standard 202C, a blank gas 202D, a first real time sample 202E, and a second real time sample 202F. Additional or alternate inputs are possible. An integrated sample refers to air collected into a vacuum canister over the entire duration of a user-defined integration period, although other sampling techniques are possible without departing from the scope of the disclosure. An integrated sample can be input into the system 200 by drawing approximately 100-500 cc of air from a sample container into the first trapping system 204. Other examples of time-integrated samples are described above with reference to FIG. 1.

Operation of the system 200 can begin with allowing the internal standard 202A gas channel to flow into the first trapping system 204 via the multi-channel valve 202 followed by either one of the calibration standards 202B, 202C (e.g., to calibrate system 200) or-by selecting at the multi-channel valve 202 either the first real time sample 202E or the second real time sample 202F (e.g., a sample or chemical sample) or from an autosampler holding sample containers collected remotely (not shown). The first trap 212 of the first trapping system 204 can retain one group of compounds (e.g., C3-C12 hydrocarbons) while fixed gasses (e.g., Nitrogen, Oxygen, Argon, CO2, Methane) and other compounds (e.g., water vapor, C2 hydrocarbons, Formaldehyde, and light freons boiling below −50° C.) pass through the first trap 212 without being substantially retained within the first trap 212.

The compounds that are not retained by the first trap 212 can flow through a switching valve (or valve system) 240 and then through the packed trap 222A of the second trapping system 224 that can be fluidly coupled to the first trap 212 of the first trapping system 204. The packed trap 222A can be packed with a strong adsorbent such as Carbon Molecular Sieve that can retain the compounds (e.g., Formaldehyde, C2 hydrocarbons, and water vapor) not retained by the multi-capillary column trap 212 in the first trapping system 204. For example, the packed trap 222A of the second trapping system 224 can be strong enough (i.e., possessing sufficient chemical affinity based on the column's length, inner diameter, and/or internal adsorbent coating) to retain the compounds of interest (e.g., C2 hydrocarbons and Formaldehyde) during the preconcentration of 100 cc to 500 cc of air at approximately 35° C.

The volume of gas being trapped by the system 200 illustrated in FIG. 2C can be measured by one of several volume measurement techniques employed by today's trapping systems (e.g., mass flow controllers, pressure increase in a reservoir of known volume, and the like). As shown in FIG. 2C, the system can include volume/pressure controllers 242 for this purpose. In some examples, the volume of gas being measured (e.g., by volume/pressure controller 242) can constitute the volume of the chemicals not being trapped by either the first trap 212 or the packed trap 222A, which includes the fixed gases (e.g., N2, O2, Ar, Methane, and some to most of the CO2 and H2O), and, when performing trace analysis, can often represent 98-99% of a sample. So, the impact on accuracy of volume measurements from collecting part of a sample (e.g., any compounds retained by the first trap 212 or the packed trap 222A) before volume measurement (e.g., by volume controller 242) can, in many embodiments, be negligible.

After trapping the C3 hydrocarbons and heavier compounds within the first trap 212 of the first trapping system 204, an inert gas (e.g., Helium) can be introduced through the multi-channel select valve 202 to purge any remaining air and water out of the first trap 212 of the first trapping system 204, while also purging the air and, in some embodiments, can also purge some water vapor from the packed trap 222A of the second trapping system 224. The first trap 212 of the first trapping system 204 can be heated and back flushed towards the second trap 232 with a comparatively smaller volume of gas than the volume of gas passed through the trap 212 during the initial operation (i.e., first adsorption process) of the first trapping system 204. That is, the volume of gas passed through the first trap 212 to "focus" the C3 hydrocarbons and other, heavier, compounds onto the second trap 232 of the first trapping system 204 to allow them to inject more rapidly into the GCMS column 236. The second trap 232 can then be pre-heated (e.g., to a desorption temperature in the range of 100-300° C.) under no flow conditions (e.g., without a substantial volume of gas flowing through the second trap 232) to facilitate a faster injection rate when the carrier gas is used to back-flush the second trap 232 to deliver the compounds that the second trap 232 retains (e.g., C3-C12 hydrocarbons) to the first detector 210 (or first chemical analysis device).

Concurrently or separately from the preheating and injection of the second trap 232 (or focusing trap) of the first trapping system 204 into the chemical separation column 236, the packed trap 222A of the second trapping system 224 can also be pre-heated to allow a faster injection from the packed trap 222A into the polar column 228, and can operate within separate GC ovens or within separate column mandrels with their associated heaters in close proximity to the chemical separation column 236. After heating the packed trap 222A, the valve system 240 can rotate to a second state and facilitate a back-flushing process of the compounds retained in column 222A (e.g., C2 hydrocarbons, Formaldehyde, and any remaining water vapor) from column 222A to the polar column 228. In some examples of system 200, a forward flush of the packed trap 222A can cause packed trap 222A to act as a separation column and further separate the C2 Hydrocarbons from each other (i.e., in addition to any separation of the C2 hydrocarbons and Formaldehyde that can occur in the PLOT column 222B). So, for some examples of the system 200, a forward flush process of the packed trap 222A can be an advantageous method of transferring the compounds retained by packed trap 222A (e.g., C2 hydrocarbons, Formaldehyde, and any remaining water) to the polar column 228 and the PLOT column 222B. For example, a forward flush process of packed trap 222A can include switching the two lines connecting to valve 240 at ports 3 and 4 with each other (FIGS. 2B and 2C). And in examples of the system 200 that include a forward flush of the packed trap 222A may even further separate the C2 Hydrocarbons and Formaldehyde at the Second Detector(s) 220 (i.e., beyond the separation that would otherwise occur in the PLOT column 222B alone).

The polar column 228 can be a polar "ionic liquid" column that retains polar compounds more readily than non-polar compounds. Thus, any C2 hydrocarbons that are flushed into the polar column 228 from the packed trap 222A can pass through the polar column 228 because they are non-polar. In some embodiments, the non-polar compounds (e.g., C2 hydrocarbons) rapidly flow through the polar column 228 (i.e., based on the rate of flow through the polar column 228 and the polar column's low affinity for non-polar compounds) and to the PLOT column 222B. In other words, the back-flushing of the packed trap 222A can facilitate the transfer of any C2 hydrocarbons initially retained by the packed trap 222A through the polar column 228 and, via the 3-way valve 226C, into the PLOT column 222B while it is at a first temperature (e.g., 30-40° C.), as described above in greater detail with reference to FIG. 2B.

The flow of gas through the polar column 228 can be to the split port 226A and can flush, or purge, substantial amounts of water vapor from the polar column 228 without purging out the retained Formaldehyde. That is, the polar column 228 in system 200 can retain Formaldehyde at temperatures between 40-60° C.; yet, at the same range of temperatures, allows 95%-99% or more of the water vapor initially retained by the column 228 to be eliminated through split port 226A.

After the process to purge water vapor via split port (or split vent) 226A (i.e., and the 3-way valve 226C closes at the split port 226A), one or more heaters can heat the polar column 228 to facilitate the release and flow of the Formaldehyde from the polar column 228 to the PLOT column 222B (e.g., by opening the 3-way valve 226C between the polar column 228 and the PLOT column 222B and then flowing gas from the selector valve 240 and through the columns 228, 222B). The system 200 can then substantially cease the flow of gas through the PLOT column 222B to allow pre-heating of the PLOT column 222B to facilitate a rapid injection of compounds from the PLOT column 222B (e.g., C2 hydrocarbons and Formaldehyde) once the flow from the (pre-heated) PLOT column 222B to the second detector(s) 220 resumes (e.g., by opening desorption gas valve 226B). That is, heating the PLOT column 222B soon before desorption and transfer to the one or more second detector(s) 220 for detection can reduce signal-peak width, and increase overall sensitivity, of the one or more second detector(s) 220.

After the C2 hydrocarbons have separated from one another and before the compounds elute through the PLOT column 222B to be detected by the one or more second detector(s) 220, the flow of fluid through the PLOT column 222B can be stopped. After water elimination and after adding the Formaldehyde to the PLOT column 222B, the PLOT column 222B can then be pre-heated to the desorption temperature (e.g., 100-300° C.) to reduce its affinity for the already separated C2 hydrocarbons and Formaldehyde. The system 200 can open desorption gas valve 226B to cause carrier (desorption) gas to flow into the PLOT column 222B and can flush the compounds of interest (e.g., Acetylene, Ethylene, Ethane, and Formaldehyde) from the PLOT column 222B to the second detector(s) 220 at a substantially high flow rate. For example, the flow rate of gas through the PLOT column 222B can result in reduced peak widths at the one or more second detector(s) 220 of approximately 2-3 seconds.

After injecting the C3 hydrocarbons and heavier compounds (e.g., compounds having boiling points in the range of −50° C. to 250° C.) into the chemical separation column 236 and the first detector 210, and the other compounds into the second detector(s) 220, a process to bake out all traps in the system 200 can begin. During bake out, the system 200 can be heated to a bake out temperature in the range of 150-230° C. to remove any traces of chemicals remaining in the system 200. Following the bake out process the system 200 can cool, e.g., via fans 216A and 236B and/or additional or alternate fans, and the system 200 can then be ready to trap and analyze the next sample according to the same steps and overall operation described above.

A computer interface can maintain and control the timing of the system 200, together with the operation of its individual components. For example, a computer interface can control the concentration of a sample and can be synchronized with the operation of one or more vacuum canisters and over a user-defined integration period (e.g., to allow the system 200 to operate, for example, every hour, every other hour, every $3^{rd}$ hour, etc.).

Figure 3:
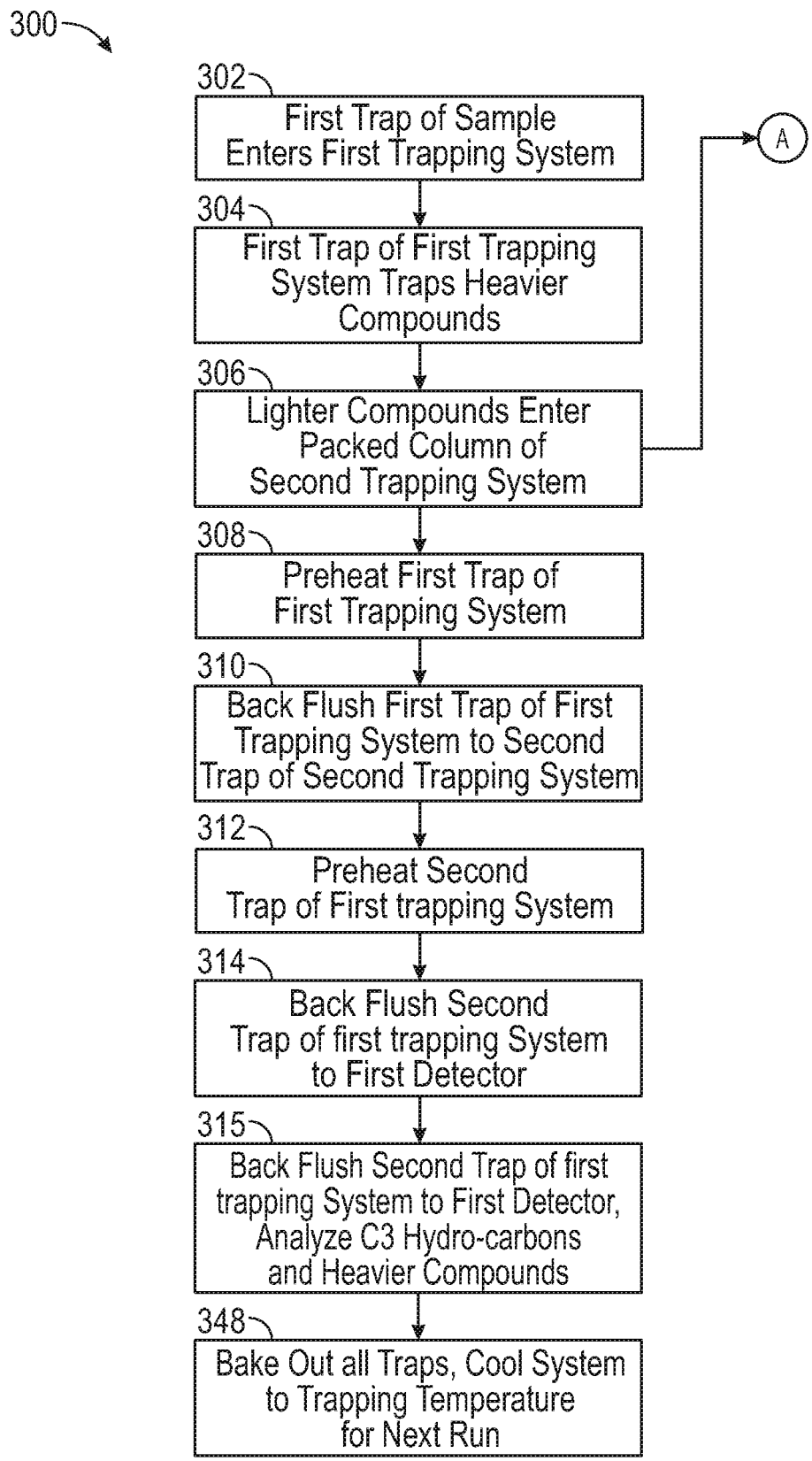
FIG. 3 illustrates an exemplary process 300 for analyzing a chemical sample according to the disclosure.
Figure 3:
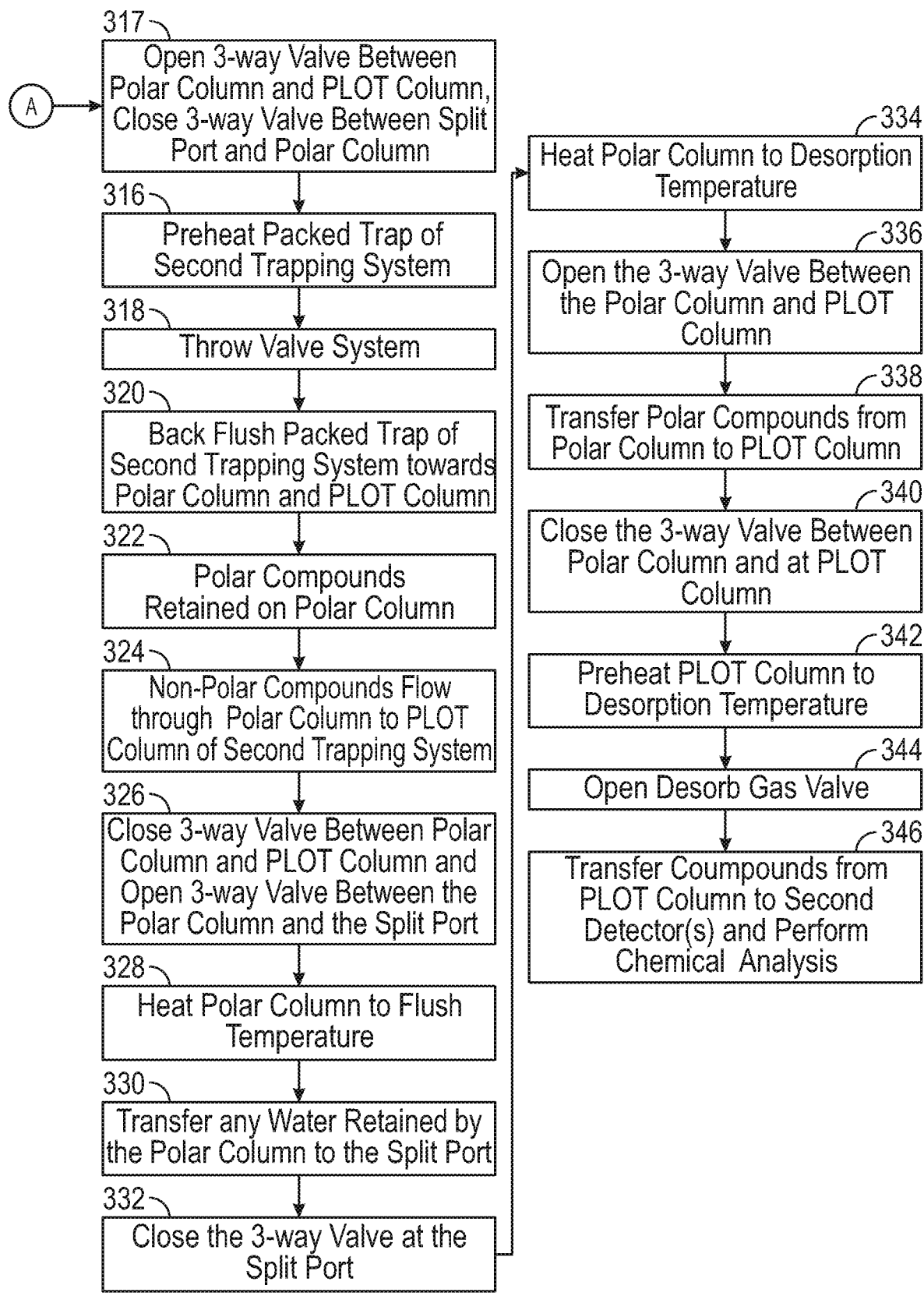

FIG. 3 illustrates an exemplary process 300 for analyzing a chemical sample according to the disclosure. In some embodiments, one or more processors (e.g., controllers, microprocessors, computers, computer systems, etc.) running software and/or instructions housed on a non-transitory computer-readable medium can be used to perform or facilitate one or more steps of the process 300.

In step 302 of process 300, the sample (e.g., a volume of air) can be delivered to the first trapping system 204 of system 200. In some embodiments, before delivering the sample to the system 200, a calibration standard (e.g., calibration standard 1 202A or calibration standard 2 202B described in detail above with reference to FIG. 2C) can be delivered to the system 200 (not shown). Moreover, an internal standard can be added to the system 200 (not shown). Alternatively, during system calibration, the internal standard and one or more calibration standards can be delivered to the system 200. The sample can be a real time sample, such as real time sample 202E or real time sample 202F. Or it can be from a non-real time sampling container as directly connected to the system 200, or through a multi-sample autosampler 2-50 or more sample containers for high productivity analysis. The calibration standards, samples, and other gases such as internal standards or blanks can be coupled to the system by an autosampler operatively coupled to the stream select valve 202. Generally, the autosamplers can add additional sample capacity. The internal standard(s) and calibration standards can directly connect to the system 200 through the inlet valve 202. Thus, the sample can enter the first trap 212 of the first trapping system 200. As described above with reference to FIGS. 2A-C, the first trap 212 of the first trapping system 204 can be a Multi-Capillary Column Trapping System (MCCTS) consisting of a series of multiple capillary columns of increasing retention strength from weakest to strongest.

In step 304 of process 300, the first trapping system 204, the first trap 212 of the first trapping system can trap the heavier (e.g., C3 hydrocarbons and above) compounds of the sample. During step 304, the first trap 212 of the first trapping system 204 can be at a trapping temperature that is in the range of 30-40° C. (e.g., 35° C.), which can cause the sample compounds to be retained in the first trap 212.

In step 306 of process 300, the lighter sample compounds (e.g., C2 hydrocarbons and Formaldehyde), bulk gases, and water vapor can traverse the first trap 212 of the first trapping system 204 and enter the packed trap 222A of the second trapping system 224. As described above with reference to FIGS. 2A-C, the packed trap 222A of the second trapping system 224 can be a packed trap containing a strong adsorbent to retain C2 Hydrocarbons and Formaldehyde that were not trapped by the first trap 212 of the first trapping system 204.

Thus, steps 302-306 of process 300 can separate the heavier compounds (e.g., C3 hydrocarbons and heavier) from the lighter compounds (e.g., C2 hydrocarbons and Formaldehyde). The heavier compounds can be trapped using the first trapping system 204 while the lighter compounds can pass through the first trapping system 204. Additionally, and as described in greater detail above with reference to FIG. 2B, the second trapping system 224 can receive the light compounds from the first trapping system 204 and can remove the water vapor from the light compounds (e.g., C2 hydrocarbons and Formaldehyde) and eventually transfer them to one or more second detector(s) 220 for chemical analysis. These processes can be executed at the same time or in series.

In step 308 of process 300, the first trap 212 of the first trapping system 204 can be heated to a desorption temperature (e.g., 100-300° C.), thereby reducing the affinity of the one or more trapped compounds to the trap 212.

In step 310 of process 300, the first trap 212 of the first trapping system 204 can be back-flushed to the second trap 232 of the first trapping system 204. As described above with reference to FIGS. 2A-2C, the second trap 232 of the first trapping system can further focus the sample into a smaller volume. Focusing the sample in this way can improve the signal to noise ratio and improve chromatographic resolution of the chemical analysis results by increasing peak height and reducing peak width, respectively.

In step 312 of process 300, the second trap 232 of the first trapping system 204 can be heated to a desorption temperature (e.g., 100-300° C.), thereby reducing the affinity of the one or more trapped compounds to trap 232.

In step 314 of process 300, the second trap 232 of the first trapping system 204 can be back-flushed to the first detector 210. The compounds can traverse a chemical separation column 236 (e.g., a GC column) before entering the detector (e.g., an MS).

In step 315 of process 300, the one or more heavier compounds (e.g., C3 hydrocarbons and heavier) can undergo chemical analysis using the first detector 210.

Thus, steps 308-315 of process 300 can be used to focus and analyze one or more heavier compounds, such as C3 hydrocarbons and heavier, of the chemical sample. During, before, or after steps 308-315, the process 300 can proceed to steps 316-344.

In step 317 of process 300, the 3-way valve 226C can open between the polar column 228 and the PLOT column 222B and the 3-way valve 226C can close between the polar column 228 and the split port 226A. Operating the 3-way valve in this way fluidly couples the polar column 228 and the PLOT column 222B while closing the split port 226A, which can allow one or more compounds to flow through the polar column 228 to the PLOT column 222B without exiting the system through the split port 226A, as will be described below.

In step 316 of process 300, the packed trap 222A of the second trapping system 224 containing the C2 hydrocarbons, Formaldehyde, and water vapor can be heated to a desorption temperature (e.g., 100-300° C.) in preparation for transferring these compounds to the rest of the second trapping system 224.

In step 318 of process 300, the valve system 240 can be thrown to its alternate position to allow the flow through the packed trap 222A of the second trapping system 224 to be reversed.

In step 320 of process 300, the packed trap 222A of the second trapping system 224 can be back-flushed (e.g., using high purity pressure controlled helium 244). That is, the flow through the packed trap 222A can proceed in the opposite direction of the direction of flow when the compounds entered the packed trap 222A towards the polar column 228 and PLOT column 222B. In some examples, and as described above, the system 200 can use the packed trap 222A similar to a packed column and forward flush the packed trap 222A towards the polar column 228 and PLOT column 222B, and may thereby separate compounds retained by the packed trap 222A (e.g., C2 Hydrocarbons and Formaldehyde) before the compounds reach the polar column 228 and the PLOT column 222B (where the compounds can continue to separate). In step 322 of process 300, one or more polar compounds of the sample (e.g., Formaldehyde and water vapor) can be retained by the polar column 228.

In step 324 of process 300, one or more non-polar compounds of the sample (e.g., C2 hydrocarbons) can flow through the polar column 228 and be retained and separated (or further separated) by the PLOT column 222B. Steps 322-324 can occur fully or partially at the same time.

Thus, steps 316-324 can separate the polar and non-polar components of the sample not retained by the first trap 212 of the first trapping system 204. The non-polar compounds, such as the C2 hydrocarbons, can be focused and separated by the PLOT column 222B while the polar compounds, such as water vapor and Formaldehyde, can be retained by the polar column 228.

In step 326 of process 300 the system 200 (or, in some embodiments, the second trapping system 224) can close the 3-way valve 226C between the polar column 228 and the PLOT column 222B and the 3-way valve 226C can open between the polar column 228 and the split port 226A.

In step 328 of process 300 the system 200 can heat the polar column 228 to a flush temperature, or a water transfer temperature, between 40° C. and 60° C. Heating the polar column 228 to a flush or water transfer temperature can facilitate eliminating water from the polar column 228 through the split port 226A without eliminating compounds of interest (e.g., Formaldehyde), as described above with reference to FIGS. 2B-C.

In step 330 of process 300 the system 200 can transfer any water retained by the polar column 228 to the split port 226A. That is, any water vapor retained on the polar column 228 can be pushed out of the second trapping system 224 (and, more generally, the system 200) through split port 226A via the 3-way valve 226C. This can be accomplished by facilitating a flow of carrier fluid through the polar column 228 (while the polar column 228 is heated to the water transfer temperature between 40° C. and 60° C.) towards the split port 226A. Because the elution volume of Formaldehyde is much greater than that of water at 40-60° C. the Formaldehyde can remain on the polar column 228 during step 330.

In step 332 of process 300 the system 200 can close the 3-way valve 226C at the split port 226A.

In step 334 of process 300 the system 200 can heat the polar column 228 to a desorption temperature between 100-300° C. Moreover, in many embodiments of system 200, during pre-heating step 334 the system 200 substantially prevents flow through the polar column 228 (e.g., "no flow" condition) to enable rapid transfer of compounds from the polar column 228 to the PLOT column 222B once flow through the polar column 228 begins after the pre-heating step 334.

In step 336 of process 300 the system 200 can open the 3-way valve 226C between the polar column 228 and the PLOT column 222B.

In step 338 of process 300, any remaining polar compounds (e.g., Formaldehyde) can be transferred from the polar column 228 to the PLOT column 222B. During step 338, the PLOT column 222B can be at a trapping temperature in the range of 30-40° C. (e.g., 35° C.) and gas can flow through the polar column 228 to the PLOT column 222B. Thus, the remaining polar compounds (e.g., Formaldehyde) can be transferred to, and retained by, the PLOT column 222B.

In step 340 of process 300 the system 200 (or in some embodiments, the second trapping system 224) can close the 3-way valve 226C between the polar column 228 and the PLOT column 222B. For example, the system 200 can control the 3-way valve 226C based on a volume transferred from the polar column 228 to the PLOT column 222B. And in many embodiments, the system 200 can transfer Formaldehyde to the PLOT column 222B from the polar column 228 in a sufficiently small volume (e.g., using a transfer processes of sufficiently small volume) to prevent, or reduce, the C2 hydrocarbons from prematurely eluting to the second detector(s) 220, such as before the final PLOT column 222B desorb stage (i.e., step 346 of process 300 described below).

In step 342 of process 300 the system 200 can perform a pre-heating process for the PLOT column 222B (i.e., pre-heat the PLOT column 222B to a desorption temperature between 100-300° C.). For example, in some embodiments, one or more heaters (e.g., heating wire, GC oven, mandrel heater, etc.) can pre-heat the PLOT column 222B before the desorption/detection step to facilitate injection of all compounds retained and separated by the PLOT column 222B (e.g., C2 hydrocarbons and Formaldehyde). And at this desorption temperature, the affinity of the C2 hydrocarbons and Formaldehyde to the PLOT column 222B can decrease, which can allow the C2 hydrocarbons and Formaldehyde to be rapidly injected into the second detector(s) 220, as will be described below. The flow of fluid into, or out of, the PLOT column 222B can cease until the system 200 begins to transfer the compounds to the second detector(s) 220 during a desorption step. That is, system 200 can perform step 342 of process 300 with substantially no flow through PLOT column 222B. The system 200 is able to reduce, substantially reduce, or prevent the flow of gas through the PLOT column 222B by ceasing to flow gas into the various inputs of the system 200, or by closing a valve at one end of the column 222B. For example, closing the 3-way valve at the PLOT column 222B and closing desorption gas valve 226B can prevent the flow of gas to the PLOT column 222B, such as during a pre-heating process described above.

In step 344 of process 300 the system 200 can open desorption gas valve 226B to facilitate the flow of desorb gas into the PLOT column 222B.

In step 346 of process 300 the system 200 (or the second trapping system 224) can perform a desorption process to transfer the compounds initially retained by the PLOT column (e.g., C2 hydrocarbons and Formaldehyde) to the second detector(s) 220 and perform a chemical analysis of those compounds. The system 200 can resume flow of gas into (and thus out of) the PLOT column 222B by opening desorption gas valve 226B (as described with reference to step 346 above) and, as a result, cause the compounds retained on the PLOT column 222B to flow rapidly to the second detector(s) 220.

The system 200 (using the one or more second detectors 220) can analyze the compounds transferred from the PLOT column 222B to the second detector(s) 220. For example, the second detector(s) 220 can be one or more of a photoionization detector and/or a flame ionization detector, as described in greater detail with reference to FIG. 2B above. Additionally, in some embodiments, the system 200 can analyze the signal generated by the second detector(s) 220 during steps 315 and 346. More specifically, one or more computer systems can interact with (or be included in) system 200 and can determine a width of a signal-peak generated during step(s) 315 or 346 in seconds (e.g., between 2-3 seconds for some embodiments) and can determine a relative magnitude between one or more peaks generated during embodiments of process 300 performed by system 200. As can be appreciated, the system 200 can determine an amount of each compound based on the area of each peak (e.g., the system 200 can integrate one or more peaks with electronics, one or more computer systems, one or more microprocessors, or the like). Moreover, the system 200 (or a microprocessor of the system 200) can multiply the area counts by a response factor. In some examples, the system can determine one or more response factors based on a calibration process performed by system 200 with a sample of known concentrations (standard) input to the system 200. Alternatively or in addition, one or more response factors can be predetermined and given to the system 200. And as can also be appreciated, the system 200 can adjust one or more response factors based on the response of a co-injected (concurrently input) internal standard of the system 200.

In step 348 of process 300 or after chemical analysis has been performed on all compounds of the sample (e.g., steps 315 and 346 of process 300), the system 200 can be baked out and then cooled to the initial trapping temperature in preparation for the next run. The system can be heated to temperatures in the range of 100-300° C. during bake out to remove any compounds remaining within the system 200, thereby cleaning the system 200 for the next run. Following bake out, the system 200 can be returned to the initial trapping temperature in the range of 30-40° C. (e.g., 35° C.) to allow trapping of the compounds of the next sample.

Therefore, according to the above, some embodiments of the disclosure include a system for analyzing a chemical sample, comprising: a first trapping system configured to trap one or more first compounds of the chemical sample; a second trapping system comprising a packed trap, a polar column, an output port and a PLOT column, wherein: the polar column is coupled to the PLOT column in series, the second trapping system is fluidly coupled to the first trapping system, and the second trapping system is configured to trap one or more second compounds of the chemical sample and one or more third compounds of the chemical sample; and one or more valves configured to: during a first trapping process: facilitate flow of the chemical sample into a portion of the first trapping system in a first direction, wherein the one or more first compounds of the chemical sample are trapped in the portion of the first trapping system during the first trapping process; and facilitate flow of the one or more second compounds of the chemical sample and the one or more third compounds of the chemical sample through the portion of the first trapping system and to the packed trap of the second trapping system, during a first desorption process of the second trapping system: facilitate flow of desorption gas through the packed trap of the second trapping system; transfer the one or more second compounds of the chemical sample and water vapor of the chemical sample to the polar column of the second trapping system; and transfer the one or more third compounds of the chemical sample through the polar column of the second trapping system and into the PLOT column of the second trapping system, and during a purging process, facilitate flow of the water vapor from the polar column to the vent port of the second trapping system. Additionally or alternatively, in some embodiments, the system further includes a chemical separation column fluidly coupled to the first trapping system and a first detector fluidly coupled in series with the chemical separation column. Additionally or alternatively, in some embodiments, the system further includes one or more second detectors fluidly coupled to the second trapping system. Additionally or alternatively, in some embodiments, the one or more second detectors comprise two second detectors fluidly coupled in series to the PLOT column of the second trapping system. Additionally or alternatively, in some embodiments, the one or more first compounds retained within the first trapping system are one or more of C3 hydrocarbons or compounds heavier than C3 hydrocarbons or compounds having higher boiling points than C3 hydrocarbons. Additionally or alternatively, in some embodiments, the one or more second compounds include Formaldehyde. Additionally or alternatively, in some embodiments, the one or more third compounds are C2 hydrocarbons. Additionally or alternatively, in some embodiments, the one or more third compounds comprise at least one of Ethane, Ethylene, or Acetylene. Additionally or alternatively, in some embodiments, the one or more valves are further configured to: transfer the one or more second compounds from the polar column to the PLOT column after the purging process, and after transferring the one or more second compounds to the PLOT column, transfer the one or more second compounds and the one or more third compounds from the PLOT column to the one or more second detectors. Additionally or alternatively, in some embodiments, the system further includes one or more heaters configured to heat the polar column to a purging temperature between 40 and 60 degrees Celsius after the one or more third compounds have been transferred to the PLOT column and before the purging process, wherein the polar column remains at the purging temperature during the purging process. Additionally or alternatively, in some embodiments, the first trapping system comprises: a first trap comprising a plurality of first capillary columns in series, the plurality of first capillary columns arranged in order of increasing chemical affinity to the one or more first compounds of the sample. Additionally or alternatively, in some embodiments, the first trapping system further comprises a second trap, and during a first desorption process of the first trapping system that occurs after the first trapping process, the one or more first compounds of the sample flow in a reverse direction from the first trap of the first trapping system to the second trap of the second trapping system. Additionally or alternatively, in some embodiments, the second trap of the first trapping system comprises a plurality of second capillary columns in series, the plurality of second capillary columns arranged in order of increasing chemical affinity to the one or more first compounds of the sample.

Some embodiments of the disclosure are directed to a method comprising during a first trapping process: facilitating flow of a chemical sample into a portion of a first trapping system in a first direction, wherein one or more first compounds of the chemical sample are trapped in the portion of the first trapping system during the first trapping process; and facilitate flow of one or more second compounds of the chemical sample and one or more third compounds of the chemical sample through the portion of the first trapping system and to a second trapping system that is fluidly coupled to the first trapping system, wherein the one or more second compounds of the chemical sample and the one or more third compounds of the chemical sample are not retained by the first trapping system during the first trapping process; during a first desorption process of the second trapping system: facilitating flow of desorption gas through a packed trap of the second trapping system; transferring the one or more second compounds of the chemical sample and water vapor of the chemical sample to a polar column of the second trapping system; and transferring the one or more third compounds of the chemical sample through the polar column of the second trapping system and into a PLOT column of the second trapping system, the polar column and the PLOT column being connected in series, and during a purging process, facilitating flow of the water vapor from the polar column to an output port of the second trapping system while the one or more second compounds of the sample remain on the polar column. Additionally or alternatively, in some embodiments, the method further comprises separating the one or more first compounds of the sample using a chemical separation column fluidly coupled to the first trapping system; and performing chemical analysis of the one or more first compounds of the sample using a first detector fluidly coupled in series with the chemical separation column. Additionally or alternatively, in some embodiments, the method further includes performing chemical analysis of the one or more second compounds of the sample and the one or more third compounds of the sample using one or more second detectors fluidly coupled to the second trapping system. Additionally or alternatively, in some embodiments, the method further includes transferring the one or more second compounds from the polar column to the PLOT column after the purging process, and after transferring the one or more second compounds to the PLOT column, transferring the one or more second compounds and the one or more third compounds from the PLOT column to the one or more second detectors. Additionally or alternatively, in some embodiments, the method further includes heating, with one or more heaters, the polar column to a purging temperature between 40 and 60 degrees Celsius after the one or more third compounds have been transferred to the PLOT column and before the purging process, wherein the polar column remains at the purging temperature during the purging process. Additionally or alternatively, in some embodiments, the first trapping system comprises: a first trap comprising a plurality of first capillary columns in series, the plurality of first capillary columns arranged in order of increasing chemical affinity to the one or more first compounds of the sample. Additionally or alternatively, in some embodiments, the first trapping system further comprises a second trap, and during a first desorption process of the first trapping system that occurs after the first trapping process, the one or more first compounds of the sample flow in a reverse direction from the first trap of the first trapping system to the second trap of the second trapping system.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A system for analyzing a chemical sample, comprising:
 a first trapping system configured to trap one or more first compounds of the chemical sample;
 a second trapping system comprising a packed trap, a polar column, an output port and a PLOT column, wherein:
  the polar column is coupled to the PLOT column in series,
  the second trapping system is fluidly coupled to the first trapping system, and the second trapping system is configured to trap one or more second compounds of the chemical sample and one or more third compounds of the chemical sample; and one or more valves configured to:

during a first trapping process:
facilitate flow of the chemical sample into a portion of the first trapping system in a first direction, wherein the one or more first compounds of the chemical sample are trapped in the portion of the first trapping system during the first trapping process; and facilitate flow of the one or more second compounds of the chemical sample and the one or more third compounds of the chemical sample through the portion of the first trapping system and to the packed trap of the second trapping system, during a first desorption process of the second trapping system:

facilitate flow of desorption gas through the packed trap of the second trapping system;
transfer the one or more second compounds of the chemical sample and water vapor of the chemical sample to the polar column of the second trapping system; and
transfer the one or more third compounds of the chemical sample through the polar column of the second trapping system and into the PLOT column of the second trapping system while retaining the one or more second compounds of the chemical sample and water vapor of the chemical sample in the polar column, and during a purging process after the one or more third compounds of the chemical sample have been transferred to the PLOT column of the second trapping system, facilitate flow of the water vapor from the polar column to the vent port of the second trapping system.

2. The system for analyzing a chemical sample of claim 1, further comprising:
a chemical separation column fluidly coupled to the first trapping system and a first detector fluidly coupled in series with the chemical separation column.

3. The system for analyzing a chemical sample of claim 1, further comprising:
one or more second detectors fluidly coupled to the second trapping system.

4. The system for analyzing a chemical sample of claim 3, wherein the one or more second detectors comprise two second detectors fluidly coupled in series to the PLOT column of the second trapping system.

5. The system for analyzing a chemical sample of claim 1, wherein the one or more first compounds retained within the first trapping system are one or more of C3 hydrocarbons or compounds heavier than C3 hydrocarbons or compounds having higher boiling points than C3 hydrocarbons.

6. The system for analyzing a chemical sample of claim 1, wherein the one or more second compounds include Formaldehyde.

7. The system for analyzing a chemical sample of claim 1, wherein the one or more third compounds are C2 hydrocarbons.

8. The system for analyzing a chemical sample of claim 1, wherein the one or more third compounds comprise at least one of Ethane, Ethylene, or Acetylene.

9. The system for analyzing a chemical sample of claim 1, wherein the one or more valves are further configured to:
transfer the one or more second compounds from the polar column to the PLOT column after the purging process, and
after transferring the one or more second compounds to the PLOT column, transfer the one or more second compounds and the one or more third compounds from the PLOT column to the one or more second detectors.

10. The system for analyzing a chemical sample of claim 1, further comprising one or more heaters configured to heat the polar column to a purging temperature between 40 and 60 degrees Celsius after the one or more third compounds have been transferred to the PLOT column and before the purging process, wherein the polar column remains at the purging temperature during the purging process.

11. The system for analyzing a chemical sample of claim 1, wherein the first trapping system comprises:
a first trap comprising a plurality of first capillary columns in series, the plurality of first capillary columns arranged in order of increasing chemical affinity to the one or more first compounds of the sample.

12. The system for analyzing a chemical sample of claim 11, wherein:
the first trapping system further comprises a second trap, and
during a first desorption process of the first trapping system that occurs after the first trapping process, the one or more first compounds of the sample flow in a reverse direction from the first trap of the first trapping system to the second trap of the second trapping system.

13. The system for analyzing a chemical sample of claim 12, wherein the second trap of the first trapping system comprises a plurality of second capillary columns in series, the plurality of second capillary columns arranged in order of increasing chemical affinity to the one or more first compounds of the sample.

14. The method of claim 1, wherein the first trapping system comprises:
a first trap comprising a plurality of first capillary columns in series, the plurality of first capillary columns arranged in order of increasing chemical affinity to the one or more first compounds of the sample.

15. The method of claim 14, wherein:
the first trapping system further comprises a second trap, and
during a first desorption process of the first trapping system that occurs after the first trapping process, the one or more first compounds of the sample flow in a reverse direction from the first trap of the first trapping system to the second trap of the second trapping system.

16. A method comprising:
during a first trapping process:
facilitating flow of a chemical sample into a portion of a first trapping system in a first direction, wherein one or more first compounds of the chemical sample are trapped in the portion of the first trapping system during the first trapping process; and
facilitate flow of one or more second compounds of the chemical sample and one or more third compounds of the chemical sample through the portion of the first trapping system and to a second trapping system that is fluidly coupled to the first trapping system, wherein the one or more second compounds of the chemical sample and the one or more third compounds of the chemical sample are not retained by the first trapping system during the first trapping process;

during a first desorption process of the second trapping system:
   facilitating flow of desorption gas through a packed trap of the second trapping system;
   transferring the one or more second compounds of the chemical sample and water vapor of the chemical sample to a polar column of the second trapping system; and
   transferring the one or more third compounds of the chemical sample through the polar column of the second trapping system and into a PLOT column of the second trapping system while retaining the one or more second compounds of the chemical sample and the water vapor of the chemical sample in the polar column, the polar column and the PLOT column being connected in series, and during a purging process after the one or more third compounds of the chemical sample have been transferred to the PLOT column of the second trapping system, facilitating flow of the water vapor from the polar column to an output port of the second trapping system while the one or more second compounds of the sample remain on the polar column.

17. The method of claim 16, further comprising:
separating the one or more first compounds of the sample using a chemical separation column fluidly coupled to the first trapping system; and
performing chemical analysis of the one or more first compounds of the sample using a first detector fluidly coupled in series with the chemical separation column.

18. The method of claim 16, further comprising:
performing chemical analysis of the one or more second compounds of the sample and the one or more third compounds of the sample using one or more second detectors fluidly coupled to the second trapping system.

19. The method of claim 16, further comprising:
transferring the one or more second compounds from the polar column to the PLOT column after the purging process, and
after transferring the one or more second compounds to the PLOT column, transferring the one or more second compounds and the one or more third compounds from the PLOT column to the one or more second detectors.

20. The method of claim 16, further comprising:
heating, with one or more heaters, the polar column to a purging temperature between 40 and 60 degrees Celsius after the one or more third compounds have been transferred to the PLOT column and before the purging process, wherein the polar column remains at the purging temperature during the purging process.

* * * * *